(12) United States Patent
Arai

(10) Patent No.: US 11,242,053 B2
(45) Date of Patent: Feb. 8, 2022

(54) VEHICLE CONTROL DEVICE

(71) Applicant: SUBARU CORPORATION, Tokyo (JP)

(72) Inventor: Shoto Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/060,609

(22) Filed: Oct. 1, 2020

(65) Prior Publication Data

US 2021/0179102 A1 Jun. 17, 2021

(30) Foreign Application Priority Data

Dec. 12, 2019 (JP) .............................. JP2019-224148

(51) Int. Cl.
*B60W 10/08* (2006.01)
*B60W 30/14* (2006.01)

(52) U.S. Cl.
CPC ..... *B60W 30/143* (2013.01); *B60W 2510/083* (2013.01); *B60W 2520/10* (2013.01); *B60W 2540/10* (2013.01); *B60W 2540/12* (2013.01); *B60W 2710/081* (2013.01); *B60W 2710/083* (2013.01)

(58) Field of Classification Search
CPC .......... B60W 30/143; B60W 2520/10; B60W 2510/083; B60W 2540/12; B60W 2710/081; B60W 2540/10; B60W 2710/083; B60W 2030/206; B60W 10/08; B60W 30/10

USPC .......................................................... 701/93

See application file for complete search history.

(56) References Cited

U.S. PATENT DOCUMENTS

| | | | | |
|---|---|---|---|---|
| 6,206,123 B1 * | 3/2001 | Kim | ....................... | B60K 31/04 |
| | | | | 180/170 |
| 2021/0245746 A1 * | 8/2021 | Arai | .................... | B60W 30/143 |

FOREIGN PATENT DOCUMENTS

| | | | | |
|---|---|---|---|---|
| CN | 107487324 A | * | 12/2017 | |
| CN | 109484405 A | * | 3/2019 | |
| DE | 102014204763 A1 | * | 9/2015 | .......... B60W 30/143 |
| JP | 2008-221935 A | | 9/2008 | |

* cited by examiner

*Primary Examiner* — Roger L Pang
(74) *Attorney, Agent, or Firm* — McGinn IP Law Group, PLLC

(57) ABSTRACT

A vehicle control device includes an identifier identifying a vehicle speed of a vehicle having a driving motor, based on a rotation speed of a power transmission shaft, and a controller controlling operation of the driving motor. The controller can switch between a normal mode of controlling acceleration/deceleration in accordance with a driver's acceleration/deceleration operation, and a cruise control mode of maintaining the vehicle speed at a target speed without being dependent on the acceleration/deceleration operation. During the cruise control mode, the controller calculates a torque command value for the driving motor by using proportional control based on a deviation between the vehicle speed and the target speed. If a prediction indicates that torsion in the shaft is to be released, the controller adjusts the torque command value such that an absolute value of torque of a proportional-control component is smaller than when the torsion is not to be released.

15 Claims, 4 Drawing Sheets

VEHICLE CONTROL DEVICE

CROSS-REFERENCE TO RELATED APPLICATIONS

The present application claims priority from Japanese Patent Application No. 2019-224148 filed on Dec. 12, 2019, the entire contents of which are hereby incorporated by reference.

BACKGROUND

The disclosure relates to vehicle control devices.

Japanese Unexamined Patent Application Publication No. 2008-221935 describes an example of a vehicle capable of executing, in addition to a normal mode, a cruise control mode for the purpose of assisting a driver in driving operation. In the normal mode, the acceleration and deceleration of the vehicle are controlled in accordance with an acceleration-and-deceleration operation (i.e., controlling of the accelerator pedal and the brake pedal) by the driver. In the cruise control mode, the vehicle speed is maintained at a target vehicle speed without being dependent on the acceleration-and-deceleration operation by the driver.

SUMMARY

An aspect of the disclosure provides a vehicle control device including an identifier and a controller. The identifier is configured to identify a vehicle speed of a vehicle equipped with a driving motor as a driving source, on a basis of a rotation speed of a power transmission shaft of the vehicle. The controller is configured to control operation of the driving motor. The controller is capable of executing a normal mode and a cruise control mode that are switchable. The normal mode is a mode in which acceleration and deceleration of the vehicle are controlled in accordance with an acceleration-and-deceleration operation by a driver. The cruise control mode is a mode in which the vehicle speed of the vehicle is maintained at a target vehicle speed by controlling torque of the driving motor without being dependent on the acceleration-and-deceleration operation by the driver. During the cruise control mode, the controller calculates a torque command value for the driving motor by using proportional control a basis of on a deviation between the vehicle speed and the target vehicle speed. In a case where a prediction indicates that torsion in the power transmission shaft is to be released, the controller executes a torque adjustment process involving adjusting the torque command value such that an absolute value of torque of a component of the proportional control in the torque command value is smaller than in a case where the prediction indicates that the torsion in the power transmission shaft is not to be released.

An aspect of the disclosure provides a vehicle control device including circuitry. The circuitry is configured to identify a vehicle speed of a vehicle equipped with a driving motor as a driving source, a basis of on a rotation speed of a power transmission shaft of the vehicle. The circuitry is configured to control operation of the driving motor. The circuitry is configured to execute a normal mode and a cruise control mode that are switchable. The normal mode is a mode in which acceleration and deceleration of the vehicle are controlled in accordance with an acceleration-and-deceleration operation by a driver. The cruise control mode is a mode in which the vehicle speed of the vehicle is maintained at a target vehicle speed by controlling torque of the driving motor without being dependent on the acceleration-and-deceleration operation by the driver. The circuitry is configured to calculate a torque command value for the driving motor by using proportional control a basis of on a deviation between the vehicle speed and the target vehicle speed during the cruise control mode, and execute a torque adjustment process in a case where a prediction indicates that torsion in the power transmission shaft is to be released. The torque adjustment process involves adjusting the torque command value such that an absolute value of torque of a component of the proportional control in the torque command value is smaller than in a case where the prediction indicates that the torsion in the power transmission shaft is not to be released.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
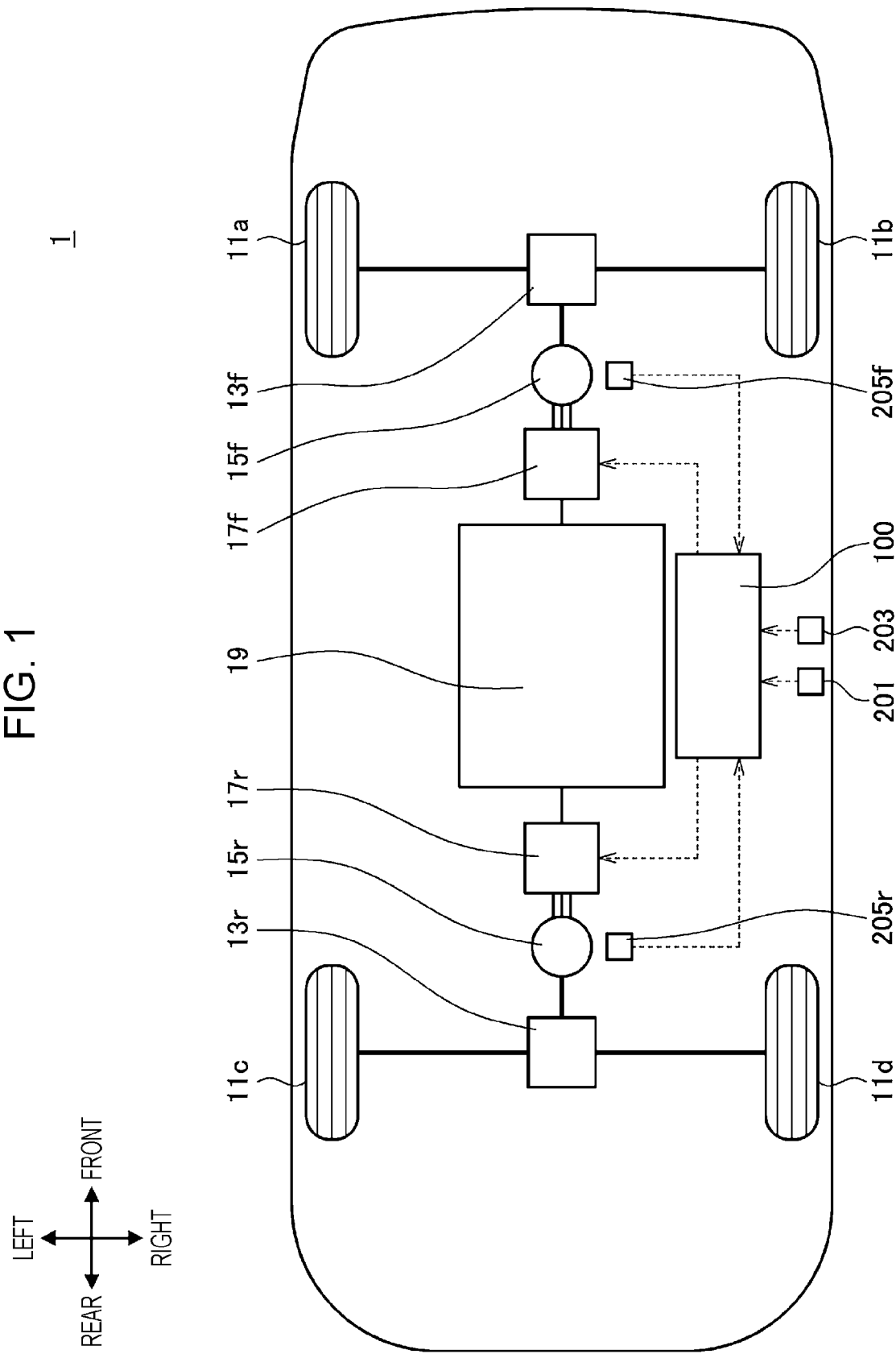
FIG. 1 schematically illustrates the configuration of a vehicle equipped with a control device according to an embodiment of the disclosure.

In a vehicle equipped with a driving motor as a driving source, torque of the driving motor is controlled in the cruise control mode so that the vehicle speed is maintained at the target vehicle speed. During the cruise control mode, the torque of the driving motor may be controlled in accordance with feedback control, such as proportional-integral-derivative (PID) control. In this case, a torque command value for the driving motor is calculated based on a deviation between the vehicle speed and the target vehicle speed.

The vehicle speed used for calculating the torque command value for the driving motor is identifiable based on the rotation speed of a power transmission shaft of the vehicle (i.e., a shaft included in a power transmission system between the driving motor and the wheels). If the torque input to the power transmission shaft suddenly changes, torsion in the power transmission shaft is released, thus causing the rotation speed of the power transmission shaft to undergo a sudden change. Consequently, due to a sudden change in the deviation between the vehicle speed and the target vehicle speed, the torque of the driving motor controlled in accordance with feedback control fluctuates, thus causing a large vibration to occur in the vehicle. In particular, as the target vehicle speed in the cruise control mode decreases, it is assumed that the vehicle is traveling more on either one of an undulating road (such as a rocky road along a river bank) and a hilly road with a high gradient. Thus, a requested value for the torque of the driving motor tends to increase, and the amount of change in the torque tends to increase. Therefore, a large vibration particularly tends to occur in the vehicle due to fluctuations in the torque.

It is desirable to provide a vehicle control device that can suppress a vibration of the vehicle during a cruise control mode.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle Configuration

The configuration of a vehicle 1 equipped with a control device 100 according to the embodiment of the disclosure will now be described with reference to FIG. 1 and FIG. 2.

FIG. 1 schematically illustrates the configuration of the vehicle 1. The vehicle 1 is illustrated in FIG. 1 such that the advancing direction of the vehicle 1 is defined as a forward direction, the reverse direction opposite to the advancing direction is defined as a rearward direction, and the left side and the right side of the vehicle 1 when oriented in the forward direction are defined as a leftward direction and a rightward direction, respectively.

The vehicle 1 is an electric vehicle that is equipped with driving motors (i.e., a front-wheel driving motor 15$f$ and a rear-wheel driving motor 15$r$ in FIG. 1) as driving sources and that travels by using power output from the driving motors.

The vehicle 1 to be described below is an example of a vehicle equipped with a control device according to an embodiment of the disclosure. As will be mentioned later, the configuration of a vehicle equipped with the control device according to the embodiment of the disclosure is not particularly limited to the configuration of the vehicle 1.

As illustrated in FIG. 1, the vehicle 1 includes front wheels 11$a$ and 11$b$, rear wheels 11$c$ and 11$d$, a front differential device 13$f$, a rear differential device 13$r$, the front-wheel driving motor 15$f$, the rear-wheel driving motor 15$r$, an inverter 17$f$, an inverter 17$r$, a battery 19, the control device 100, an accelerator opening-degree sensor 201, a brake sensor 203, a front-wheel-motor rotation-speed sensor 205$f$, and a rear-wheel-motor rotation-speed sensor 205$r$.

The front wheel 11$a$, the front wheel 11$b$, the rear wheel 11$c$, and the rear wheel 11$d$ may simply be referred to as wheels 11 if they are not to be distinguished from one another. Furthermore, the front-wheel driving motor 15$f$ and the rear-wheel driving motor 15$r$ may simply be referred to as driving motors 15 if they are not to be distinguished from each other. Moreover, the inverter 17$f$ and the inverter 17$r$ may simply be referred to as inverters 17 if they are not to be distinguished from each other. Furthermore, the front-wheel-motor rotation-speed sensor 205$f$ and the rear-wheel-motor rotation-speed sensor 205$r$ may simply be referred to as motor rotation-speed sensors 205 if they are not to be distinguished from each other.

The front-wheel driving motor 15$f$ is a driving motor that outputs power for driving the front wheels 11$a$ and 11$b$. The front wheel 11$a$ corresponds to a left front wheel, and the front wheel 11$b$ corresponds to a right front wheel.

In detail, the front-wheel driving motor 15$f$ is driven by using electric power supplied from the battery 19. The front-wheel driving motor 15$f$ is coupled to the front differential device 13$f$. The front differential device 13$f$ is coupled to the front wheels 11$a$ and 11$b$ by using a driving shaft. The power output from the front-wheel driving motor 15$f$ is transmitted to the front differential device 13$f$, and is subsequently transmitted distributively to the front wheels 11$a$ and 11$b$ by the front differential device 13$f$.

The front-wheel driving motor 15$f$ is, for example, a polyphase alternating-current motor and is coupled to the battery 19 with the inverter 17$f$ interposed therebetween. Direct-current electric power supplied from the battery 19 is converted into alternating-current electric power by the inverter 17$f$ before being supplied to the front-wheel driving motor 15$f$.

In addition to outputting power for driving the front wheels 11$a$ and 11$b$, the front-wheel driving motor 15$f$ functions as an electric generator that generates electricity by using kinetic energy of the front wheels 11$a$ and 11$b$. In a case where the front-wheel driving motor 15$f$ functions as an electric generator, electricity is generated by the front-wheel driving motor 15$f$, and a braking force is applied to the vehicle 1 in accordance with regenerative braking. Alternating-current electric power generated by the front-wheel driving motor 15$f$ is converted into direct-current electric power by the inverter 17$f$ before being supplied to the battery 19, whereby the battery 19 is recharged.

The rear-wheel driving motor 15$r$ is a driving motor that outputs power for driving the rear wheels 11$c$ and 11$d$. The rear wheel 11$c$ corresponds to a left rear wheel, and the rear wheel 11$d$ corresponds to a right rear wheel.

In detail, the rear-wheel driving motor 15$r$ is driven by using electric power supplied from the battery 19. The rear-wheel driving motor 15$r$ is coupled to the rear differential device 13$r$. The rear differential device 13$r$ is coupled to the rear wheels 11$c$ and 11$d$ by using a driving shaft. The power output from the rear-wheel driving motor 15$r$ is transmitted to the rear differential device 13$r$, and is subsequently transmitted distributively to the rear wheels 11$c$ and 11$d$ by the rear differential device 13$r$.

The rear-wheel driving motor 15$r$ is, for example, a polyphase alternating-current motor and is coupled to the battery 19 with the inverter 17$r$ interposed therebetween. Direct-current electric power supplied from the battery 19 is converted into alternating-current electric power by the inverter 17$r$ before being supplied to the rear-wheel driving motor 15$r$.

In addition to outputting power for driving the rear wheels 11$c$ and 11$d$, the rear-wheel driving motor 15$r$ functions as an electric generator that generates electricity by using kinetic energy of the rear wheels 11$c$ and 11$d$. In a case where the rear-wheel driving motor 15$r$ functions as an electric generator, electricity is generated by the rear-wheel driving motor 15$r$, and a braking force is applied to the vehicle 1 in accordance with regenerative braking. Alternating-current electric power generated by the rear-wheel driving motor 15$r$ is converted into direct-current electric power by the inverter 17$r$ before being supplied to the battery 19, whereby the battery 19 is recharged.

The accelerator opening-degree sensor 201 detects an accelerator opening degree indicating an amount by which the accelerator pedal is operated by the driver, and outputs the detection result.

The brake sensor 203 detects a brake operation amount indicating an amount by which the brake pedal is operated by the driver, and outputs the detection result.

The front-wheel-motor rotation-speed sensor 205$f$ detects the rotation speed of the front-wheel driving motor 15$f$ and outputs the detection result. The rear-wheel-motor rotation-speed sensor 205$r$ detects the rotation speed of the rear-wheel driving motor 15$r$ and outputs the detection result. The detection results of the motor rotation-speed sensors 205 are used as information indicating the rotation speed of a power transmission shaft (i.e., a shaft included in a power transmission system between the driving motors 15 and the wheels 11) of the vehicle 1 in a process performed by the control device 100.

The control device 100 includes, for example, a central processing unit (CPU) serving as an arithmetic processing unit, a read-only memory (ROM) serving as a storage element that stores programs and arithmetic parameters to be used by the CPU, and a random access memory (RAM) serving as a storage element that temporarily stores parameters that appropriately change in a process executed by the CPU.

The control device 100 communicates with each of the devices (e.g., the inverters 17, the accelerator opening-degree sensor 201, the brake sensor 203, and the motor rotation-speed sensors 205) provided in the vehicle 1. The communication between the control device 100 and each device is realized by using, for example, controller area network (CAN) communication.

Figure 2:
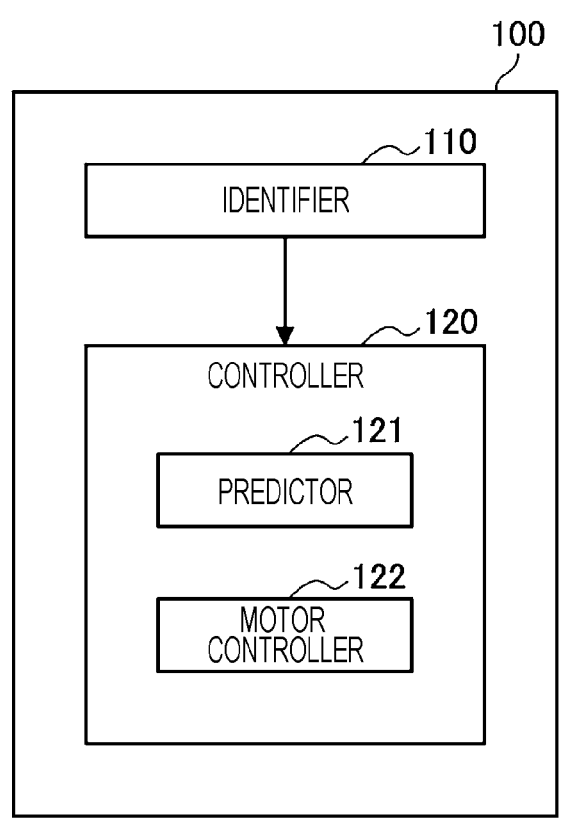
FIG. 2 is a block diagram illustrating an example of a functional configuration of the control device according to the embodiment of the disclosure.

FIG. 2 is a block diagram illustrating an example of a functional configuration of the control device 100.

For example, as illustrated in FIG. 2, the control device 100 has an identifier 110 and a controller 120.

The identifier 110 identifies the vehicle speed of the vehicle 1 (simply referred to as "vehicle speed" hereinafter) based on the rotation speed of the power transmission shaft of the vehicle 1. Information indicating the vehicle speed identified by the identifier 110 is output to the controller 120 and is used in a process performed by the controller 120.

In detail, the identifier 110 identifies the vehicle speed based on the detection results of the motor rotation-speed sensors 205. The vehicle speed may be identified by using the detection results of both the front-wheel-motor rotation-speed sensor 205$f$ and the rear-wheel-motor rotation-speed sensor 205$r$ or by using the detection result of one of the front-wheel-motor rotation-speed sensor 205$f$ and the rear-wheel-motor rotation-speed sensor 205$r$.

Furthermore, the vehicle speed may be identified by using information (e.g., information indicating the rotation speeds of the driving shafts that couple the wheels 11 and the differential devices to each other) other than the detection results of the motor rotation-speed sensors 205 as information indicating the rotation speed of the power transmission shaft of the vehicle 1.

The controller 120 controls the operation of each device in the vehicle 1 to control the traveling of the vehicle 1. For example, the controller 120 includes a predictor 121 and a motor controller 122.

The predictor 121 predicts whether torsion in the power transmission shaft of the vehicle 1 is to be released. The power transmission shaft is a shaft that receives torque transmitted between the driving motors 15 and the wheels 11 and is twisted in accordance with the received torque. Thus, when the torque received by the power transmission shaft suddenly changes, the torsion in the power transmission shaft is released, thereby causing the rotation speed of the power transmission shaft to undergo a sudden change.

The motor controller 122 controls the operation of each inverter 17 and thus controls the operation of each driving motor 15. In detail, the motor controller 122 controls the operation of a switching element of the inverter 17$f$ and thus controls the supply of electric power between the battery 19 and the front-wheel driving motor 15$f$. Consequently, the motor controller 122 can control the production of power and the generation of electricity by the front-wheel driving motor 15$f$. Moreover, the motor controller 122 controls the operation of a switching element of the inverter 17$r$ and thus controls the supply of electric power between the battery 19 and the rear-wheel driving motor 15$r$. Consequently, the motor controller 122 can control the production of power and the generation of electricity by the rear-wheel driving motor 15$r$.

In a case where the motor controller 122 is to drive the driving motors 15 to apply a driving force to the vehicle 1, the motor controller 122 may drive both the front-wheel driving motor 15$f$ and the rear-wheel driving motor 15$r$ or may drive one of the front-wheel driving motor 15$f$ and the rear-wheel driving motor 15$r$.

In the case where both the front-wheel driving motor 15$f$ and the rear-wheel driving motor 15$r$ are to be driven, the distribution of the driving force of each driving motor 15 can be appropriately set. In the following description, the torque of the driving motors 15 refers to a total value of the torque of the front-wheel driving motor 15$f$ and the torque of the rear-wheel driving motor 15$r$.

The controller 120 is capable of switching the driving mode of the vehicle 1 between a normal mode and a cruise control mode. A normal mode is a driving mode in which the acceleration and deceleration of the vehicle 1 are controlled in accordance with an acceleration-and-deceleration operation (i.e., controlling of the accelerator pedal and the brake pedal) by the driver. A cruise control mode is a driving mode in which the vehicle speed is maintained at a target vehicle speed by controlling the torque of the driving motors 15 without being dependent on the acceleration-and-deceleration operation by the driver.

Furthermore, the controller 120 is capable of switching the cruise control mode between a high-speed cruise control mode and a low-speed cruise control mode. In the low-speed cruise control mode, a target vehicle speed used is lower than a target vehicle speed in the high-speed cruise control mode. For example, a target vehicle speed in the high-speed cruise control mode is set to a speed ranging between 20 km/h and 115 km/h inclusive, whereas a target vehicle speed in the low-speed cruise control mode is set to a speed ranging between 2 km/h and 15 km/h inclusive. A target vehicle speed in the cruise control mode is adjustable in accordance with, for example, an input operation performed by the driver.

For example, the vehicle 1 is provided with an input device (e.g., either one of a switch and a button) used for selecting the driving mode from among the normal mode, the high-speed cruise control mode, and the low-speed cruise control mode. The driver can select the driving mode by operating the input device. The controller 120 executes the driving mode selected by the driver. If a specific operation, such as a braking operation, is performed by the driver during the cruise control mode, the controller 120 stops the cruise control mode and switches to the normal mode.

In the normal mode, the controller 120 controls the operation of the driving motors 15 such that the driving force applied to the vehicle 1 accords with the opening degree of the accelerator pedal. Consequently, the acceleration of the vehicle 1 can be controlled in accordance with the controlling of the accelerator pedal by the driver. Furthermore, the controller 120 controls the operation of a braking device, such as a hydraulic braking device, equipped in the vehicle 1 such that the braking force applied to the vehicle 1 accords with the brake operation amount. Consequently, the deceleration of the vehicle 1 can be controlled in accordance with the controlling of the brake pedal by the driver.

In the cruise control mode, the controller 120 calculates a torque command value for the driving motors 15 and controls the torque of the driving motors 15 to the torque command value such that the vehicle speed approaches the target vehicle speed. For example, the controller 120 uses feedforward control based on the vehicle speed and feedback control (e.g., proportional-integral-derivative (PID) control) based on a deviation between the vehicle speed and the target vehicle speed to control the torque of the driving motors 15, and calculates a torque command value as a command for the torque to the driving motors 15. In this case, for example, a torque command value Tc to be calculated is expressed using Expression (1) indicated below.

$$Tc = Tf + Tp + Ti + Td \quad (1)$$

In Expression (1), Tf denotes the torque of a feedforward-control component based on the vehicle speed, Tp denotes the torque of a proportional-control component (i.e., P component) based on a deviation between the vehicle speed and the target vehicle speed, Ti denotes the torque of an integral-control component (i.e., I component) based on the deviation, and Td denotes the torque of a derivative-control component (i.e., D component) based on the deviation. The torque Tp of the P component is obtained by multiplying the deviation by a gain. The torque Ti of the I component is obtained by multiplying an integral value of the deviation by a gain. The torque Td of the D component is obtained by multiplying a derivative value of the deviation by a gain. The torque Tf of the feedforward-control component corresponds to an estimated torque to be used for maintaining the vehicle speed at the target vehicle speed when the vehicle 1 is traveling on a flat road. A flat road refers to a road in which an absolute value of a gradient (i.e., an inclination in the advancing direction of the vehicle 1 relative to the horizontal direction) is smaller than or equal to a predetermined value. A downhill road to be mentioned later refers to a road other than a flat road and having a negative gradient, and an uphill road to be mentioned later refers to a road other than a flat road and having a positive gradient.

Although the following description relates to an example where the torque command value Tc for the driving motors 15 is calculated by using Expression (1), the calculation method for the torque command value Tc for the driving motors 15 is not limited to this example. The torque command value Tc for the driving motors 15 may be calculated by using at least the proportional control. For example, the feedforward control may be omitted from the above example (i.e., the torque Tf may be omitted from Expression (1)), or the PID control may be replaced with proportional-integral (PI) control (i.e., the torque Td may be omitted from Expression (1)).

The function that the control device 100 according to the embodiment has may partially be distributed to a plurality of control devices, or a plurality of functions may be realized by a single control device. In a case where the function that the control device 100 has is partially distributed to a plurality of control devices, the plurality of control devices may be coupled to each other by using a communication bus, such as a controller area network (CAN).

As mentioned above, the controller 120 of the control device 100 can execute the cruise control mode in which the vehicle speed of the vehicle 1 is maintained at the target vehicle speed by controlling the torque of the driving motors 15 without being dependent on the acceleration-and-deceleration operation by the driver. If it is predicted that the torsion in the power transmission shaft is to be released during the cruise control mode, the controller 120 executes a torque adjustment process for adjusting the torque command value Tc such that the absolute value of the torque Tp of the proportional-control component (i.e., the P component) in the torque command value Tc for the driving motors 15 becomes smaller than that in a case where it is predicted that the torsion in the power transmission shaft is not to be released. Consequently, in a case where the deviation between the vehicle speed and the target vehicle speed changes suddenly due to a sudden change in the rotation speed of the power transmission shaft, fluctuations in the torque of the driving motors 15 controlled in accordance with feedback control can be suppressed. Thus, a vibration of the vehicle 1 caused by the releasing of the torsion in the power transmission shaft during the cruise control mode can be suppressed. A process performed by the controller 120 during the cruise control mode (i.e., a process for suppressing a vibration of the vehicle 1) will be described in detail later.

Operation of Control Device

Next, the operation of the control device 100 according to the embodiment of the disclosure will be described with reference to FIG. 3 and FIG. 4.

As mentioned above, if it is predicted that the torsion in the power transmission shaft is to be released during the cruise control mode, the aforementioned torque adjustment process (i.e., a process for adjusting the torque command value Tc such that the absolute value of the torque Tp of the P component in the torque command value Tc for the driving motors 15 becomes smaller than that in a case where it is predicted that the torsion in the power transmission shaft is not to be released) is executed, so that a vibration of the vehicle 1 can be suppressed.

As the target vehicle speed in the cruise control mode decreases, an amount of change in the torque tends to increase, and the torsion in the power transmission shaft tends to increase. Thus, in the low-speed cruise control mode, as compared with the high-speed cruise control mode, when the torsion in the power transmission shaft is released as the torque fluctuates, a large vibration particularly tends to occur in the vehicle 1. Therefore, if it is predicted that the torsion in the power transmission shaft is to be released during the low-speed cruise control mode, the controller 120 desirably executes the torque adjustment process.

Although the following description relates to an example where the torque adjustment process is executed during the low-speed cruise control mode, the controller 120 may execute the torque adjustment process if it is predicted, during the high-speed cruise control mode, that the torsion in the power transmission shaft is to be released. Alternatively, the controller 120 may be configured not to execute the torque adjustment process during the high-speed cruise control mode.

Furthermore, although the following description relates to an example where the torque adjustment process involves removing the torque Tp of the P component from the torque command value Tc, the content of the torque adjustment process is not limited to such an example, as will be described later.

Figure 3:
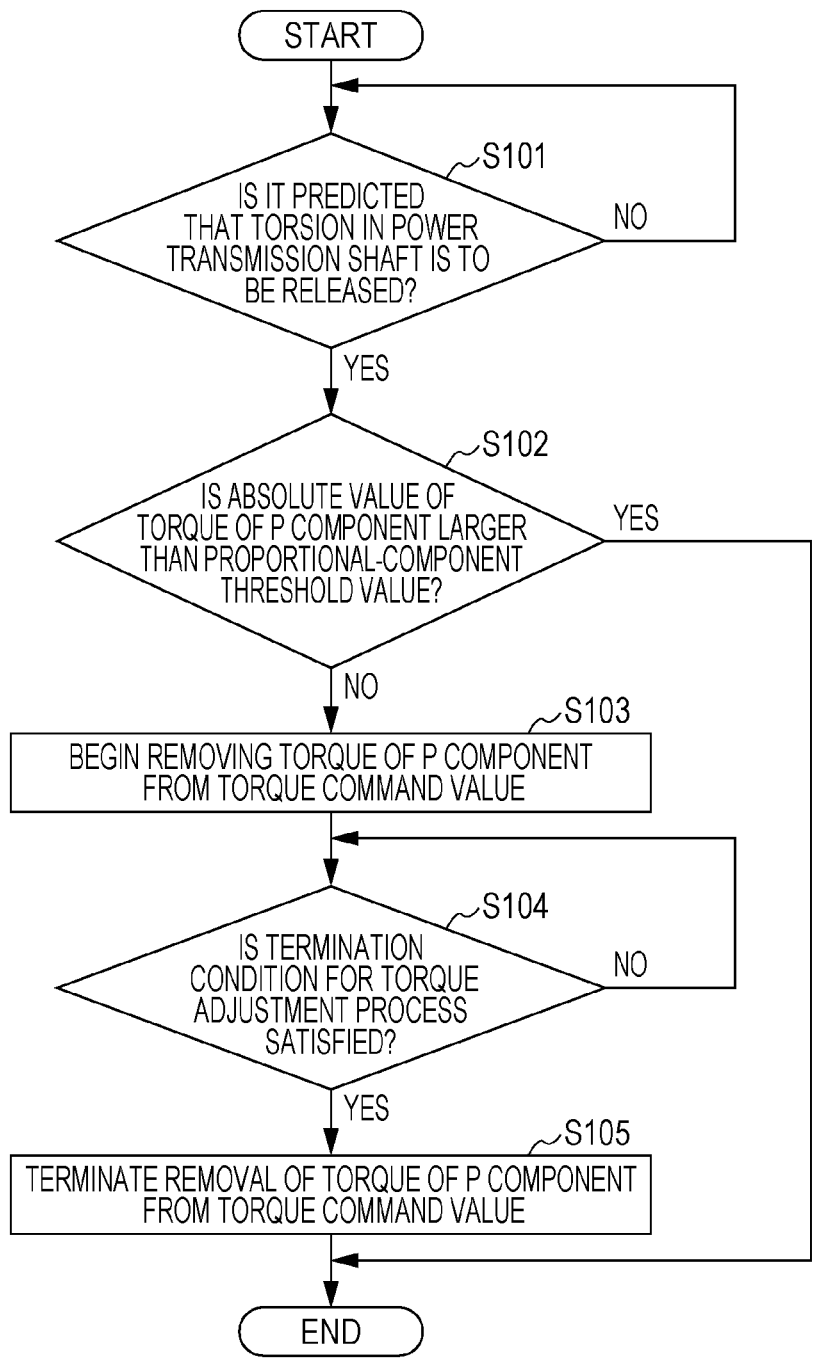
FIG. 3 is a flowchart illustrating an example of the flow of a process performed by a controller of the control device according to the embodiment of the disclosure during a low-speed cruise control mode.

FIG. 3 is a flowchart illustrating an example of the flow of a process performed by the controller 120 during the low-speed cruise control mode. In detail, the control flow illustrated in FIG. 3 is repeatedly executed during the low-speed cruise control mode.

Figure 4:
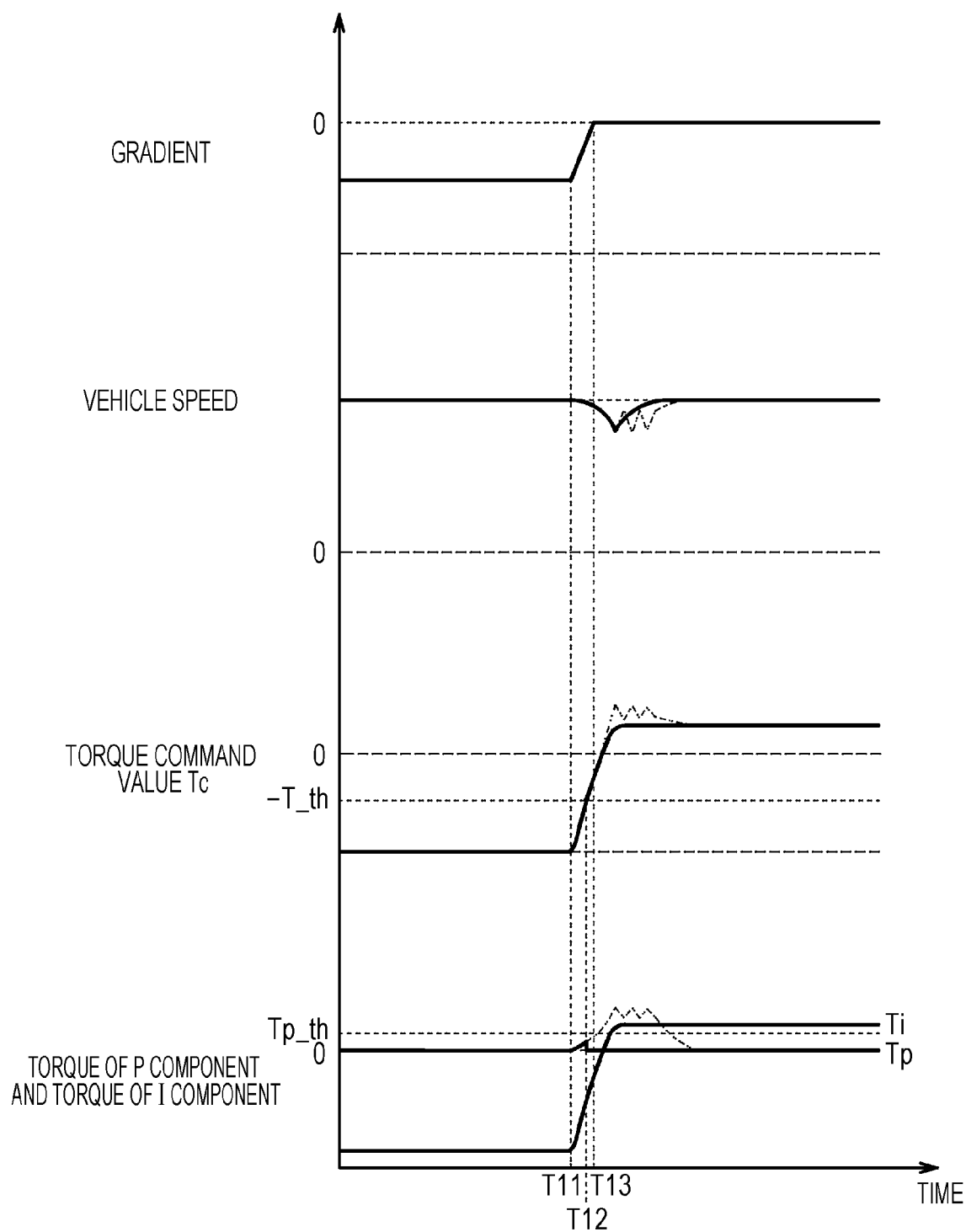
FIG. 4 illustrates an example of transition of various types of state quantities in a case where torsion in a power transmission shaft is released as the vehicle according to the embodiment of the disclosure enters a flat road from a downhill road.

FIG. 4 illustrates an example of transition of various types of state quantities in a case where torsion in the power transmission shaft is released as the vehicle 1 enters a flat road from a downhill road. In detail, FIG. 4 illustrates the transition of various types of state quantities including the gradient of a road, the vehicle speed, the torque command value Tc, the torque Tp of the P component, and the torque Ti of the I component. A positive direction of torque is a direction in which a driving force is applied to the vehicle 1 (i.e., the advancing direction of the vehicle 1), whereas a negative direction of torque is a direction in which a braking force is applied to the vehicle 1 (i.e., the reverse direction of the vehicle 1). In FIG. 4, the torque Tf of the feedforward-control component and the torque Td of the D component in PID control are not illustrated.

The process in the control flow illustrated in FIG. 3 will be described below while referring to FIG. 4, where appropriate.

When the control flow illustrated in FIG. 3 commences, the predictor 121 first predicts in step S101 whether the torsion in the power transmission shaft of the vehicle 1 is to be released. If it is predicted that the torsion in the power transmission shaft of the vehicle 1 is to be released (YES in step S101), the control flow proceeds to a determination process in step S102. In contrast, if it is predicted that the torsion in the power transmission shaft is not to be released (NO in step S101), the prediction process in step S101 is repeated.

For example, the predictor 121 predicts whether the torsion in the power transmission shaft is to be released based on an absolute value of the torque of the driving motors 15. In this case, for example, if the absolute value of the torque of the driving motors 15 falls below a torque threshold value, the predictor 121 predicts that the torsion in the power transmission shaft is to be released. The predictor 121 uses, for example, the torque command value Tc as information indicating the torque of the driving motors 15. Accordingly, the torque usable in the process for predicting whether the torsion in the power transmission shaft is to be released may be a command value (i.e., a calculated value) for the torque of the driving motors 15 or may be a measured value of the torque of the driving motors 15.

In the example illustrated in FIG. 4, the vehicle 1 is traveling on a downhill road having a negative gradient prior to a time point T11. When traveling on a downhill road, the vehicle 1 receives its own weight in the direction in which the vehicle 1 is accelerated in the advancing direction. Thus, torque is desirably applied to the vehicle 1 in the negative direction to maintain the vehicle speed at the target vehicle speed. In the example illustrated in FIG. 4, prior to the time point T11, the torque Ti of the I component is a negative value and the torque command value Tc is a negative value. Thus, a braking force according to regenerative braking can be applied to the vehicle 1, and therefore the vehicle speed can be maintained at the target vehicle speed. At the time point T11, the gradient begins to change toward zero, and the vehicle 1 starts to enter a flat road. Thus, at the time point T11, the vehicle speed begins to decrease, causing the vehicle speed to be lower than the target vehicle speed. Accordingly, the torque Tp of the P component and the torque Ti of the I component increase from the time point T11 and onward.

At a time point T12 subsequent to the time point T11, the predictor 121 predicts that the torsion in the power transmission shaft is to be released when the absolute value of the torque command value Tc falls below a torque threshold value T_th (i.e., −T_th<Tc<T_th). At a time point T13 subsequent to the time point T12, the vehicle 1 has completely entered the flat road. From the time point T13 and onward, the torque command value Tc is inverted from a negative value to a positive value. Accordingly, in a case where the vehicle 1 enters a flat road from a downhill road, the direction of the torque of the driving motors 15 is inverted (i.e., the torque input to the power transmission shaft suddenly changes), and the torsion in the power transmission shaft is thus released.

The aforementioned torque threshold value T_th is appropriately set to a value based on which it is properly determinable whether the absolute value of the torque of the driving motors 15 has decreased to an extent that it is predicted that the direction of the torque of the driving motors 15 is to be inverted. Thus, the predictor 121 can predict that the direction of the torque of the driving motors 15 is to be inverted when the absolute value of the torque of the driving motors 15 falls below the torque threshold value T_th, and the predictor 121 can therefore predict that the torsion in the power transmission shaft is to be released.

The above description relates to an example where the prediction process in step S101 is performed based on the absolute value of the torque of the driving motors 15. Alternatively, the prediction process in step S101 may be performed by using another parameter. For example, the predictor 121 may predict whether the torsion in the power transmission shaft is to be released based on a temporal change rate of the torque (i.e., an amount of change in the torque per unit time) of the driving motors 15. For example, in a case where it is predicted, based on the temporal change rate of the torque of the driving motors 15, that the direction of the torque of the driving motors 15 is to be inverted, the predictor 121 predicts that the torsion in the power transmission shaft is to be released. For example, if the torque of the driving motors 15 changes in a direction toward 0 N and the temporal change rate of the torque is higher than a change-rate threshold value, the predictor 121 may predict that the direction of the torque of the driving motors 15 is to be inverted and that the torsion in the power transmission shaft is to be released. The aforementioned change-rate threshold value is appropriately set to a value based on which it is properly determinable whether the temporal change rate of the torque of the driving motors 15 has increased to an extent that it is predicted that the direction of the torque of the driving motors 15 is to be inverted.

If the determination result obtained in step S101 in FIG. 3 indicates YES, the controller 120 determines in step S102 whether the absolute value of the torque Tp of the P component is larger than a proportional-component threshold value. If it is determined that the absolute value of the torque Tp of the P component is larger than the proportional-component threshold value (YES in step S102), the control flow illustrated in FIG. 3 ends. In contrast, if it is determined that the absolute value of the torque Tp of the P component is not larger than the proportional-component threshold value (NO in step S102), the control flow proceeds to step S103 where the controller 120 begins to remove the torque Tp of the P component from the torque command value Tc (i.e., begins the torque adjustment process).

The control flow illustrated in FIG. 3 does not proceed to step S103 if the determination result obtained in step S102 indicates YES, and the torque adjustment process is not executed. That is, even in a case where it is predicted that the torsion in the power transmission shaft is to be released, if the absolute value of the torque Tp of the P component is larger than the proportional-component threshold value, the controller 120 does not execute the torque adjustment process. In the case where the absolute value of the torque Tp of the P component is excessively large, if the torque adjustment process is executed and, for example, if the torque Tp of the P component is removed from the torque command value Tc, the torque of the driving motors 15 changes excessively, causing a large shock to occur in the vehicle 1.

The aforementioned proportional-component threshold value is appropriately set to a value based on which it is properly determinable whether the absolute value of the torque Tp of the P component is large to an extent that it is assumed that a large shock may occur in the vehicle 1 when the torque adjustment process is executed. The controller 120 does not execute the torque adjustment process if the determination result obtained in step S102 indicates YES, and therefore occurrence of a large shock in the vehicle 1 as a result of executing the torque adjustment process can be suppressed.

For example, in the example illustrated in FIG. 4, since the absolute value of the torque Tp of the P component is smaller than a proportional-component threshold value Tp_th (i.e., −Tp_th<Tp<Tp_th) at the time point T12 when it is predicted that the torsion in the power transmission shaft is to be released, the determination result obtained in step S102 indicates NO, and the torque adjustment process for removing the torque Tp of the P component from the torque command value Tc is commenced. Consequently, the torque Tp of the P component used for calculating the torque command value Tc becomes zero from the time point T12 and onward.

In FIG. 4, the transition of the vehicle speed, the transition of the torque command value Tc, and the transition of the torque Tp of the P component in a case where the torque adjustment process is supposedly not commenced at the time point T12 are indicated with double-dotted chain lines. From the time point T13 and onward, the torsion in the power transmission shaft is released and the rotation speed of the power transmission shaft undergoes a sudden change as the vehicle 1 enters a flat road from a downhill road. As mentioned above, the vehicle speed used for calculating the torque command value Tc is identified based on the rotation speed of the power transmission shaft. Therefore, from the time point T13 and onward, the vehicle speed changes suddenly due to a sudden change in the rotation speed of the power transmission shaft, and the deviation between the vehicle speed and the target vehicle speed undergoes a sudden change.

Of the torques of the PID-control components calculated based on the deviation between the vehicle speed and the target vehicle speed, the torque Tp of the P component tends to change easily in conjunction with a change in the deviation, as compared with the torque Ti of the I component. Thus, if the torque adjustment process supposedly does not commence at the time point T12, the torque Tp of the P component fluctuates significantly in conjunction with a sudden change in the deviation between the vehicle speed and the target vehicle speed from the time point T13 and onward, as indicated with a double-dotted chain line in FIG. 4. Consequently, the vehicle speed and the torque Tp of the P component affect each other and change continuously to increase or decrease rapidly within a short period of time, and the torque command value Tc changes continuously to increase or decrease rapidly within a short period of time. This causes a large vibration to occur in the vehicle 1.

On the other hand, in the embodiment, as illustrated in FIG. 4, the torque adjustment process commences at the time point T12, and the torque Tp of the P component used for calculating the torque command value Tc becomes zero from the time point T12 and onward. Consequently, if the vehicle speed suddenly changes and the deviation between the vehicle speed and the target vehicle speed suddenly changes due to a sudden change in the rotation speed of the power transmission shaft from the time point T13 and onward, a situation where the vehicle speed and the torque Tp of the P component affect each other and change continuously to increase or decrease rapidly within a short period of time can be suppressed. Thus, since a situation where the torque command value Tc changes continuously to increase or decrease rapidly within a short period of time can be suppressed, a vibration of the vehicle 1 can be suppressed.

Although the torque Td of the D component also tends to change easily in conjunction with a change in the deviation between the vehicle speed and the target vehicle speed, the absolute value of the torque Td of the D component is smaller than both the torque Tp of the P component and the torque Ti of the I component, and therefore the effect that the torque Td of the D component has on the vibration of the vehicle 1 is relatively small. Thus, the torque command value Tc is adjusted to decrease the absolute value of the torque Tp of the P component in the torque adjustment process, thereby appropriately suppressing a vibration of the vehicle 1.

In the example illustrated in FIG. 4, when the absolute value of the torque of the driving motors 15 falls below the torque threshold value T_th (i.e., when the absolute value of the torque command value Tc falls below the torque threshold value T_th), it is predicted that torsion in the power transmission shaft is to be released, and the torque adjustment process commences. Thus, by varying the torque threshold value T_th, the ease of commencing the torque adjustment process can be varied. The predictor 121 desirably varies the torque threshold value T_th in accordance with the vehicle speed. For example, the predictor 121 may increase the torque threshold value T_th with decreasing vehicle speed. Since the magnitude of the torque of the driving motors 15 increases with decreasing vehicle speed, an amount of change in the torque tends to increase easily, thus causing a large vibration to particularly occur due to fluctuations in the torque. Thus, the torque threshold value T_th is increased with decreasing vehicle speed so that the ease of commencing the torque adjustment process is improved, thereby effectively suppressing a vibration of the vehicle 1.

After step S103 in FIG. 3, the controller 120 determines in step S104 whether a termination condition for the torque adjustment process is satisfied. If it is determined that the termination condition for the torque adjustment process is satisfied (YES in step S104), the controller 120 proceeds to step S105 to terminate the removal of the torque Tp of the P component from the torque command value Tc (i.e., terminate the torque adjustment process), thereby ending the control flow illustrated in FIG. 3. In contrast, if it is determined that the termination condition for the torque adjustment process is not satisfied (NO in step S104), the determination process in step S104 is repeated.

The termination condition is for determining whether the various types of state quantities are sufficiently stable to an extent that the torque adjustment process is not to be executed after the torsion in the power transmission shaft is released. For example, the termination condition may be a condition in which the vehicle speed has become stable. For example, in a case where a difference between a maximum value and a minimum value of the vehicle speed within a reference time period is smaller than or equal to a reference value, the controller 120 may determine that the vehicle speed has become stable. Furthermore, for example, the termination condition may be a condition in which the torque command value Tc has become stable. For example, in a case where a difference between a maximum value and a minimum value of the torque command value Tc within a reference time period is smaller than or equal to a reference value, the controller 120 may determine that the torque command value Tc has become stable.

The above description relates to an example where the torque adjustment process involves removing the torque Tp of the P component from the torque command value Tc. Alternatively, the content of the torque adjustment process is not limited to the above example. For example, the torque adjustment process performed by the controller 120 may involve multiplying the torque Tp of the P component by a gain smaller than 1. Furthermore, for example, the torque adjustment process performed by the controller 120 may involve adjusting the absolute value of the torque Tp of the P component to a predetermined upper limit value or smaller if the absolute value of the torque Tp exceeds the upper limit value.

The above description with reference to FIG. 4 relates to a case where the vehicle 1 enters a flat road from a downhill road. Since the direction of the torque of the driving motors 15 is also inverted when the vehicle 1 enters an uphill road from a downhill road or when the vehicle 1 enters a downhill road from either one of a flat road and an uphill road, the torque input to the power transmission shaft suddenly changes, and the torsion in the power transmission shaft is released. Thus, also in these cases, the predictor 121 can predict that the direction of the torque of the driving motors 15 is to be inverted when, for example, the absolute value of the torque of the driving motors 15 falls below the torque threshold value, and can predict that the torsion in the power transmission shaft is to be released, thereby executing the torque adjustment process.

Furthermore, the above description relates to an example where it is predicted that the torsion in the power transmission shaft is to be released when it is predicted that the direction of the torque of the driving motors 15 is to be inverted. Alternatively, the predictor 121 may predict that the torsion in the power transmission shaft is to be released in a case other than the case where it is predicted that the direction of the torque of the driving motors 15 is to be inverted. For example, when the vehicle 1 enters a flat road from an uphill road or when the vehicle 1 enters an uphill road from a flat road, the direction of the torque of the driving motors 15 is maintained, whereas torque to be input to the power transmission shaft changes by a relatively large amount, possibly causing the torsion in the power transmission shaft to be released. Thus, for example, when it is predicted that the vehicle 1 is to enter a flat road from an uphill road or is to enter an uphill road from a flat road as a result of using map data or the like, the predictor 121 may predict that the torsion in the power transmission shaft is to be released, and may execute the torque adjustment process.

Advantages of Control Device

Next, the advantages of the control device 100 according to the embodiment of the disclosure will be described.

In the control device 100 according to the embodiment, if it is predicted that the torsion in the power transmission shaft is to be released during the cruise control mode, the controller 120 executes the torque adjustment process for adjusting the torque command value Tc such that the absolute value of the torque Tp of the P component in the torque command value Tc for the driving motors 15 becomes smaller than that in a case where it is predicted that the torsion in the power transmission shaft is not to be released. Consequently, in a case where the deviation between the vehicle speed and the target vehicle speed changes suddenly due to a sudden change in the rotation speed of the power transmission shaft, fluctuations in the torque of the driving motors 15 controlled in accordance with feedback control can be suppressed. In detail, a situation where the vehicle speed and the torque Tp of the P component affect each other and change continuously to increase or decrease rapidly within a short period of time can be suppressed. Thus, a vibration of the vehicle 1 can be suppressed during the cruise control mode.

Furthermore, in the control device 100 according to the embodiment, the controller 120 desirably predicts whether the torsion in the power transmission shaft is to be released based on the absolute value of the torque of the driving motors 15. Consequently, it can be properly predicted that the torsion in the power transmission shaft is to be released when it is predicted that the direction of the torque of the driving motors 15 is to be inverted.

Furthermore, in the control device 100 according to the embodiment, if the absolute value of the torque of the driving motors 15 falls below the torque threshold value, the controller 120 desirably predicts that the torsion in the power transmission shaft is to be released. Consequently, it can be properly predicted that the torsion in the power transmission shaft is to be released when it is predicted that the direction of the torque of the driving motors 15 is to be inverted.

Furthermore, in the control device 100 according to the embodiment, the controller 120 desirably varies the torque threshold value in accordance with the vehicle speed. Consequently, the ease of commencing the torque adjustment process can be varied in accordance with the vehicle speed. Thus, for example, if the vehicle speed is low and the amount of change in the torque of the driving motors 15 tends to increase easily, the ease of commencing the torque adjustment process can be improved, thereby effectively suppressing a vibration of the vehicle 1.

Furthermore, in the control device 100 according to the embodiment, the controller 120 desirably predicts whether the torsion in the power transmission shaft is to be released based on the temporal change rate of the torque of the driving motors 15. Consequently, it can be properly predicted that the torsion in the power transmission shaft is to be released when it is predicted that the direction of the torque of the driving motors 15 is to be inverted.

Furthermore, in the control device 100 according to the embodiment, if it is predicted that the direction of the torque of the driving motors 15 is to be inverted, the predictor 121 desirably predicts that the torsion in the power transmission shaft is to be released. Consequently, if the torque input to the power transmission shaft suddenly changes due to the direction of the torque of the driving motors 15 being inverted when, for example, the vehicle 1 enters a flat road from a downhill road, it can be properly predicted that the torsion in the power transmission shaft is to be released.

Furthermore, in the control device 100 according to the embodiment, even when it is predicted that the torsion in the power transmission shaft is to be released during the cruise control mode, the controller 120 desirably does not execute the torque adjustment process if the absolute value of the torque Tp of the P component is larger than the proportional-component threshold value. Consequently, occurrence of a large shock in the vehicle 1 as a result of executing the torque adjustment process can be suppressed.

Furthermore, in the control device 100 according to the embodiment, the torque command value Tc includes the torque Tp of the P component and the torque Ti of the I-control component, and the controller 120 desirably removes the torque Tp of the P component from the torque command value Tc in the torque adjustment process. Consequently, in a case where the deviation between the vehicle speed and the target vehicle speed changes suddenly due to a sudden change in the rotation speed of the power transmission shaft, fluctuations in the torque of the driving motors 15 controlled in accordance with feedback control can be suppressed by using a component, such as the torque Ti, other than the torque Tp for calculating the torque command value Tc. In detail, a situation where the vehicle speed and the torque Tp of the P component affect each other and change continuously to increase or decrease rapidly within a short period of time can be effectively suppressed. Thus, a vibration of the vehicle 1 can be effectively suppressed during the cruise control mode.

Furthermore, in the control device 100 according to the embodiment, if it is predicted that the torsion in the power transmission shaft is to be released during the low-speed cruise control mode, the controller 120 desirably executes the torque adjustment process. As mentioned above, in the low-speed cruise control mode, the torsion in the power transmission shaft is released with fluctuations in the torque due to the target vehicle speed being low, as compared with the high-speed cruise control mode, thus easily causing a large vibration to particularly occur in the vehicle 1. Therefore, if it is predicted that the torsion in the power transmission shaft is to be released during the low-speed cruise control mode, the torque adjustment process is executed so that the advantage of suppressing the vibration in the vehicle 1 during the cruise control mode can be effectively utilized.

Although the embodiment of the disclosure has been described above with reference to the appended drawings, the disclosure is not limited to the above embodiment. Needless to say, various modifications and alterations within the scope defined the claims are included in the technical scope of the disclosure.

For example, although the vehicle 1 described above is an electric vehicle equipped with the front-wheel driving motor 15f and the rear-wheel driving motor 15r as driving sources, the configuration of the vehicle equipped with the control device according to the embodiment of the disclosure is not particularly limited to the vehicle 1. For example, the vehicle equipped with the control device according to the embodiment of the disclosure may be an electric vehicle provided with different driving motors (i.e., four driving motors) for the individual wheels, or may be a hybrid vehicle equipped with a driving motor and an engine as driving sources. Furthermore, for example, the vehicle equipped with the control device according to the embodiment of the disclosure may be a vehicle obtained by adding a component to, changing a component in, or deleting a component from the vehicle 1 described with reference to FIG. 1.

Furthermore, for example, the process described with reference to the flowchart in this description may be executed in a sequence different from that indicated in the flowchart. Moreover, an additional step may be used, or one or more steps may be omitted.

The control device 100 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 100 including the identifier 110 and the controller 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle control device comprising:
    an identifier configured to identify a vehicle speed of a vehicle equipped with a driving motor as a driving source, on a basis of a rotation speed of a power transmission shaft of the vehicle; and
    a controller configured to control operation of the driving motor,
    wherein the controller is capable of executing a normal mode and a cruise control mode that are switchable, the normal mode being a mode in which acceleration and deceleration of the vehicle are controlled in accordance with an acceleration-and-deceleration operation by a driver, the cruise control mode being a mode in which the vehicle speed of the vehicle is maintained at a target vehicle speed by controlling torque of the driving motor without being dependent on the acceleration-and-deceleration operation by the driver,
    wherein, during the cruise control mode, the controller calculates a torque command value for the driving motor by using proportional control on a basis of a deviation between the vehicle speed and the target vehicle speed, and
    wherein, in a case where a prediction indicates that torsion in the power transmission shaft is to be released, the controller executes a torque adjustment process involving adjusting the torque command value such that an absolute value of torque of a component of the proportional control in the torque command value is smaller than in a case where the prediction indicates that the torsion in the power transmission shaft is not to be released.

2. The vehicle control device according to claim 1, wherein the controller predicts, on a basis of an absolute value of the torque of the driving motor, whether the torsion in the power transmission shaft is to be released.

3. The vehicle control device according to claim 2,
wherein the controller predicts that the torsion in the power transmission shaft is to be released if the absolute value of the torque of the driving motor falls below a torque threshold value.

4. The vehicle control device according to claim 3,
wherein the controller varies the torque threshold value in accordance with the vehicle speed.

5. The vehicle control device according to claim 1,
wherein the controller predicts, on a basis of a temporal change rate of the torque of the driving motor, whether the torsion in the power transmission shaft is to be released.

6. The vehicle control device according to claim 2,
wherein the controller predicts, on a basis of a temporal change rate of the torque of the driving motor, whether the torsion in the power transmission shaft is to be released.

7. The vehicle control device according to claim 1,
wherein the controller predicts that the torsion in the power transmission shaft is to be released if a prediction indicates that a direction of the torque of the driving motor is to be inverted.

8. The vehicle control device according to claim 2,
wherein the controller predicts that the torsion in the power transmission shaft is to be released if a prediction indicates that a direction of the torque of the driving motor is to be inverted.

9. The vehicle control device according to claim 1, wherein, even when the prediction indicates that the torsion in the power transmission shaft is to be released during the cruise control mode, the controller does not execute the torque adjustment process if the absolute value of the torque of the component of the proportional control is larger than a proportional-component threshold value.

10. The vehicle control device according to claim 2, wherein, even when the prediction indicates that the torsion in the power transmission shaft is to be released during the cruise control mode, the controller does not execute the torque adjustment process if the absolute value of the torque of the component of the proportional control is larger than a proportional-component threshold value.

11. The vehicle control device according to claim 1,
wherein the torque command value includes the torque of the component of the proportional control and torque of a component of integral control on the basis of the deviation between the vehicle speed and the target vehicle speed, and
wherein the controller removes the torque of the component of the proportional control from the torque command value in the torque adjustment process.

12. The vehicle control device according to claim 2,
wherein the torque command value includes the torque of the component of the proportional control and torque of a component of integral control on the basis of the deviation between the vehicle speed and the target vehicle speed, and
wherein the controller removes the torque of the component of the proportional control from the torque command value in the torque adjustment process.

13. The vehicle control device according to claim 1,
wherein the cruise control mode includes a high-speed cruise control mode and a low-speed cruise control mode that are switchable and executable by the controller, the low-speed cruise control mode being a mode in which a target vehicle speed is lower than a target vehicle speed in the high-speed cruise control mode, and
wherein, if a prediction indicates that the torsion in the power transmission shaft is to be released during the low-speed cruise control mode, the controller executes the torque adjustment process.

14. The vehicle control device according to claim 2,
wherein the cruise control mode includes a high-speed cruise control mode and a low-speed cruise control mode that are switchable and executable by the controller, the low-speed cruise control mode being a mode in which a target vehicle speed is lower than a target vehicle speed in the high-speed cruise control mode, and
wherein, if a prediction indicates that the torsion in the power transmission shaft is to be released during the low-speed cruise control mode, the controller executes the torque adjustment process.

15. A vehicle control device comprising circuitry configured to
identify a vehicle speed of a vehicle equipped with a driving motor as a driving source, on a basis of a rotation speed of a power transmission shaft of the vehicle,
control operation of the driving motor,
execute a normal mode and a cruise control mode that are switchable, the normal mode being a mode in which acceleration and deceleration of the vehicle are controlled in accordance with an acceleration-and-deceleration operation by a driver, the cruise control mode being a mode in which the vehicle speed of the vehicle is maintained at a target vehicle speed by controlling torque of the driving motor without being dependent on the acceleration-and-deceleration operation by the driver,
calculate a torque command value for the driving motor by using proportional control on a basis of a deviation between the vehicle speed and the target vehicle speed during the cruise control mode, and
execute a torque adjustment process in a case where a prediction indicates that torsion in the power transmission shaft is to be released, the torque adjustment process involving adjusting the torque command value such that an absolute value of torque of a component of the proportional control in the torque command value is smaller than in a case where the prediction indicates that the torsion in the power transmission shaft is not to be released.

\* \* \* \* \*